| United States Patent [19] | [11] 3,970,619 |
| Snapp, Jr. et al. | [45] July 20, 1976 |

[54] POLYMERIC HYDROXYLATED POLYESTERETHERS AND POLYURETHANE FLEXIBLE FOAM PREPARED THEREFROM

[75] Inventors: Thomas C. Snapp, Jr.; Alden E. Blood; Sam H. Johnson, Jr., all of Longview, Tex.

[73] Assignee: Eastman Kodak Company, Rochester, N.Y.

[22] Filed: Dec. 19, 1974

[21] Appl. No.: 534,527

[52] U.S. Cl. .................... 260/2.5 AN; 260/2.5 AG; 260/78.3 R
[51] Int. Cl.² .................. C08G 4/00; C08G 18/14; C08G 18/42
[58] Field of Search .................. 260/2.5 AN, 78.3 R

[56] References Cited
UNITED STATES PATENTS

| 2,163,109 | 6/1939 | Spanagel | 260/78.3 R |
| 2,808,390 | 10/1957 | Caldwell | 260/78.3 R |
| 3,063,968 | 11/1962 | Schultz | 260/78.3 R |
| 3,645,941 | 2/1972 | Snapp et al. | 260/78.3 R |

OTHER PUBLICATIONS

T921,029, Apr. 1974, Snapp et al., Def. Pub. 921, 260/78.3 R.

*Primary Examiner*—H.S. Cockeram
*Attorney, Agent, or Firm*—Clyde L. Tootle; Daniel B. Reece, III

[57] ABSTRACT

The present invention relates to polymeric hydroxylated polyesterethers and the use of such compounds in preparing polyurethane flexible foam. The hydroxylated polyesterethers are prepared from p-dioxanone, polycarboxylic acids and polyols. These polymeric hydroxylated polyesterethers can then be reacted with polyisocyanates to produce a flexible, foamed polyurethane.

18 Claims, No Drawings

POLYMERIC HYDROXYLATED POLYESTERETHERS AND POLYURETHANE FLEXIBLE FOAM PREPARED THEREFROM

This invention relates to polymeric hydroxylated polyesterethers and their use in preparing foamed or cellular polyurethanes. More particularly, the invention relates to polyesterethers prepared from p-dioxanone, polycarboxylic acids and polyols and to flexible polyurethane foam prepared from such hydroxylated polyesterethers and polyisocyanates.

It is recognized from the prior art that hydroxyl group-containing polyethers and hydroxyl group-containing polyesters afford flexible foams by their reaction with a polyisocyanate and the simultaneously foaming and curing of the isocyanate modified polyester or polyether by internal development of carbon dioxide and crosslinking of the modified polymer. Important advantages in performance properties can be found for polyurethane foams prepared from either polyesters or polyethers or mixtures of such hydroxyl group-containing compounds. Therefore, these advantages could be more fully realized by the incorporation of the ether and ester moieties into a single polymer chain. This invention therefore relates to the inclusion of ethers and esters functionally derived from p-dioxanone into a polymeric network and their application in foam applications.

While it is known in the prior art to react lactones with polyols and acids, the prior art does not disclose the reaction of the p-dioxanone moiety into a polyester formulation to yield a polyesterether polymer. These novel hydroxylated polyesterethers possess unique physical properties as a result of the dual functionality in the polymeric stucture. These novel hydroxylated polymers exhibit properties characteristic of known polyesters and polyethers. Therefore, it is the novel combination of functionality (ester, ether and hydroxyl) which results in these polymers being highly suitable for the preparation of polyurethane foams. These foams show properties typical of both polyether and polyester urethanes. Therefore, the hydroxylated polyesterether polymers derived from p-dioxanone afford a unique polyurethane foam product as a result of the combination of these functional moieties.

The novel hydroxylated polyesterethers of the present invention are prepared by the reaction of a mixture composed of p-dioxanone, a dicarboxylic acid, and a dihydroxyl compound. If desired, a polyol such as a tri- or tetrahydroxyl compound can also be added as a reactant in the preparation of the desired polyesterether. The polyol reactant provides a polyesterether polymer with a higher molecular weight thereby providing different physical properties to the flexible foam.

The dicarboxylic acids useful for the preparation of the polyurethane prepolymers include acids having the general formula

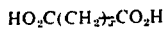

where $x$ is from 2 to 8. Such acids also include diglycolic acid and the phthalic acids (ortho-, meta-, or para-isomers) as well as anhydrides of such acids, such as phthalic anhydride and the like.

The dihydroxyl compounds useful in this invention include alkylene glycols, alkylene ether glycols of the general formula

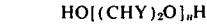

where Y is either H or $CH_3$ and $n$ is 1 to 20. Such diols also suitable for this reaction are alkyl substituted alkylene glycols, cyclohexanediols, neopentyl glycol, 2,2,4-trimethyl-1,3-pentanediol, and neopentyl monohydroxypivalate and the like.

The p-dioxanones useful in the present invention include substituted and unsubstituted dioxanones such as p-dioxanone, 3-methyl-p-dioxanone, 3,5-dimethyl-p-dioxanone, 6-methyl-p-dioxanone, 3-ethyl-p-dioxanone, 3-phenyl-p-dioxanone, chloro-p-dioxanone and the like.

The polyol useful for the preparation of these novel polyesterethers include organic compounds containing three or more hydroxyl groups. Polyols of particular interest include glycerine, trimethylolpropane, trimethylolethane, pentaerythritol, dipentaerythritol, and tripentaerythritol and the like.

The synthesis of the novel polyesterethers of this invention are prepared by the polymerization of the mixture of reactants at temperatures from 75°C. to 200°C. in order to achieve good rates of reaction and minimum decomposition of the reactants. When temperatures below 75°C. are used, the rate of reaction is slow and long processing times are required. When temperatures above 200°C. are used, darkening of the reaction product results. During the polymerization reaction an inert atmosphere is preferably utilized to obtain a product with excellent color.

The polymerization may be achieved by a catalyzed or noncatalyzed process. The novel polyesterethers of this invention produced by either the catalyzed or non-catalyzed reaction have similar acid and hydroxyl numbers, color, and molecular weight. If a catalyst is employed, the catalyst concentration may range from 0.001 percent to as high as 1.0 percent by weight of the reaction mixture. A wide variety of acidic and basic catalysts may be employed in the polymerization. Suitable acidic catalysts which may be employed are the chlorides of aluminum, tin, antimony, cadmium, gallium, zinc, bismuth, and beryllium, and the like. Suitable basic catalysts that may be employed include the metals such as lithium, sodium, potassium, magnesium, calcium, barium, zinc, strontium, aluminum, tin, lead, and cerium, as well as the alkoxides thereof, the carbonates of the alkali and alkaline earth metals, organic tin oxides and titanates, zinc oxide, litharge, and antimony oxide, and the like.

The duration of the polymerization varies from 3 to 24 hours depending upon whether a catalyst is used, the ratio of the reactants and desired acid hydroxyl numbers of the polyesterether. The presence of various catalysts in the reaction lowers the period of time required to prepare the polyesterether.

The hydroxylated polyesterether compositions of this invention can be made from various molar ratios of reactants such as 1.0–7.5:1.2–3.5:0.0–0.5:1.0 of p-dioxanone, the diol reactant, the polyol reactant and the diacid, respectively. Each of the resulting polymers possess a low acid number (milligrams of potassium hydroxide per gram of polyester using phenolphthalein as an indicator) of about 1–5. The hydroxyl number, which is a measure of the number of terminal hydroxyl groups, is defined in terms of milligrams of KOH per gram of polymer for these hydroxylated polyesterethers is 30–200.

The preparation of polyurethane foams from the hydroxylated polyesterether polymers is carried out by reaction of these hydroxylated polymers with a molar excess of an aliphatic, cycloaliphatic or aromatic polyisocyanate. Suitable polyisocyanates useful for the preparation of such foams with the polymers of this invention are m- and p-phenylene diisocyanates; tolylene diisocyanates; xylylene diisocyanates; hexamethylene diisocyanates; biphenyl diisocyanates; and diphenylmethane diisocyanates. The aromatic diisocyanates are more reactive and less toxic than the aliphatic members, and are consequently preferred. The compounds which are at present most readily available commercially are 2,4-tolylene diisocyanate, 2,6-tolylene diisocyanate and mixtures thereof. However, others may be used, among them methylene bis(4-phenylisocyanate), 3,3'-bitolylene-4,4'-diisocyanate, 3,3'-dimethoxy-4,4'-biphenylene diisocyanate, naphthaline-1,5-diisocyanate, 1,3,5-benzene triisocyanate, polymethylene polyphenylisocyanate, as well as the many impure or crude polyisocyanates that are commercially available, such as crude mixture of methylene bis(4-phenylisocyanate).

The diisocyanate concentration can be varied from about 100 to 600 percent of isocyanato groups with respect to the total number of hydroxyl and carboxyl groups in the hydroxyl-containing polymer and foaming agent. The preferred concentration is about 100 percent.

In preparation of the foam the mixture of the hydroxylated polyesterether polymer and diisocyanate component is mixed with water in the presence of a catalyst. Depending upon the desired properties of the foam and the amount of crosslinking, the amount of water should be such that the ratio of equivalents of water to residual isocyanate equivalents (i.e., the isocyanate which is present as excess isocyanate over the reactive groups of the lactone polyesters) be in a range of 0.75:1 to 1.25:1.

The basic method of forming the foamed polymers by the polyisocyanate reaction can be carried out with these novel hydroxylated polyesterethers to produce foams with excellent compression set, tensile strength and density. It is apparent that there is considerable latitude in the method of this invention, not only with regard to the hydroxylated polyesterether formulation, but also with regard to the choice of the isocyanate formulation, as well as their relative proportions. The choice to be made among these variables is governed largely by the type of foamed polymer ultimately desired.

Catalysts that are suitable for foaming and crosslinking reaction include inorganic and organic bases such as sodium hydroxide, sodium methylate, sodium acetate, tributylamine, triethylamine, triethanolamine N-methylmorpholine, N,N-dimethylbenzylamine, N-ethylmorpholine, triamylamine and organotin compounds such as stannous acetate, dibutyltin oxide, and dibutyltin dilaurate. Catalyst concentrations between 0.1 and 3.0 weight percent, based on the weight of the total formulation, are recommended. Mixtures of the above catalysts can be used to formulate the urethane foam.

In order to stabilize the composition during the foaming, a stabilizing or thickening agent can be employed to avoid breaking of the carbon dioxide bubbles in the early stages of the foaming. Concentrations of 0.005 to 4.0 weight percent based on total ingredients are suitable. Suitable materials for this application are ethoxylated cellulose, polyvinyl chloride, acetyl cellulose and polyvinyl acetate. Small quantities, 0.01 to 1.0 weight percent based on the total ingredients, of silicone oils or paraffin oils are useful for regulation of the bubble size of the foam. Increased concentrations result in larger foam bubblers.

These novel hydroxylated polyesterethers possess unique physical properties as a result of the inserted dual functionality in the polymeric structure. These new hydroxylated polymers exhibit properties characteristic of known polyesters and polyethers. It is the novel combination of functionality (ester, ether and hydroxyl) which results in these polymers being highly suitable for polyurethane foams. These foams show properties typical of both polyether urethane and polyester urethane. Thus, the hydroxylated polyesterether polymers derived from p-dioxanone afford a unique polyurethane foam product as a result of the combination of the functional moieties.

The synthesis of the hydroxylated polyesterether polymers from p-dioxanone can be achieved by bulk polymerization with or without an azeotropic agent and with or without a catalyst. Nonaqueous mixtures of the reactants (p-dioxanone, dihydroxyl component, dicarboxylic acid and polyol) are preferred for the reaction. An inert atmosphere is preferred in this synthesis but is not essential to achieve polymerization of the reactants.

The reactants can be premixed before reaction or fed separately to the reactor for preparation of the polyesterether polymer. Whereas excellent results were obtained while operating at atmospheric pressure, we have found the polymerization reaction can be conducted at elevated pressure. Agitation of the reaction mixture is helpful in maintaining uniformity of the reactants during polymerization.

The preparation of the polyurethane foams from the above polymers involved a thorough mixing of the polyesterether, the diisocyanate, the catalyst and emulsifier at room temperature. This reaction was accompanied by an increase in viscosity and temperature. After a period of time (1–20 minutes) the temperature of this prepolymer began to decrease, the water was added and the mixture stirred violently. The mixture was transferred to an open mold as the foaming began. The resulting molded foam was cured at 75°–125°C. for 8–24 hours to give a cellular foam product. These parameters may be changed depending on the hydroxylated polyesterether formulation, the diisocyanate used in the polyurethane reaction, the urethane catalyst, the emulsifier, the ratio of water in the urethane formulation and the reaction parameters in the polyetherester preparation and polyurethane foamed formulation. Also if desired, a foaming agent such as freon can be used which requires the use of less diisocyanate.

The process of the invention is illustrated in greater detail by the following examples which are all conducted at atmospheric pressure. It will be understood, however, that these examples are not intended to limit the invention in any way and obvious modifications will occur to those skilled in the art.

EXAMPLE 1

This example demonstrates the preparation of a hydroxylated polyesterether with a p-dioxanone, a dihydroxyl component and a dicarboxylic acid and its application in polyurethane foam.

Adipic acid (142 grams), 255 grams of p-dioxanone and 164 grams of ethylene glycol are heated at 160°C. for 7 hours under nitrogen. The resulting polyesterether polymer has an acid number of 2.3, a hydroxyl number of 31.2 and a molecular weight of 2255.

A 100 gram portion of the above hydroxylated polyesterether polymer is mixed with 46 grams of 2,4-tolylene diisocyanate, 0.6 gram of stannous octoate, 0.6 gram of hydroxyethyl cellulose and 1.0 gram of silicone oil for 10 minutes. To this mixture is added 3.6 grams of water with rapid stirring. The resulting foam is molded and cured at 100°C. for 12 hours. The polyurethane foam shows excellent resistance to hydrolysis and organic solvents. The cured foam has a density of 2.6 pounds per cubic foot and a tear strength of 4.5 pounds per inch.

EXAMPLE 2

This example demonstrates the use of a polyol in the preparation of a hydroxylated polyesterether polymer derived from p-dioxanone.

To 255 grams of p-dioxanone, 355 grams of adipic acid and 161.9 grams of ethylene glycol is added 23.3 grams of trimethylolpropane. This mixture is heated at 170°C. for 8 hours to give a viscous liquid in a 96 percent yield. The product has a Gardner color of less than one with an acid number of 1.9 and a hydroxyl number of 64.1. Molecular weight of the polymer is 1762.

The polyurethane foam from this hydroxylated polymer with a 2,4-tolylene diisocyanate, stannous octoate, hydroxyethyl cellulose, silicone oil and water formulation results in a flexible foam with a density of 2.13 pounds per cubic foot. Good low temperature properties and tear strength are noted with this foam.

EXAMPLE 3

This example shows the use of an aromatic acid in the synthesis of the hydroxylated polyesterether polymer.

To 306 grams of p-dioxanone, 93 grams of ethylene glycol and 26.8 grams of trimethylolpropane is added 148 grams phthalic anhydride. This mixture is heated at 155°C. for 8 hours to give a viscous liquid which has a Gardner color of less than one. The acid number of the polymeric product is 2.3 with a hydroxyl number of 105 and a molecular weight of 1550.

The polyurethane foam of this hydroxylated polyesterether polymer by the procedure in Example 1 has a density of 1.8 pounds per cubic foot with a tear strength of 4.3 pounds per inch.

EXAMPLE 4

This example shows the use of a tetrahydroxy compound as the polyol in the synthesis of the hydroxylated polyesterether polymer.

Into a mixture of 510 grams of p-dioxanone, 186 grams of eythylene glycol and 40.8 grams of pentaerythritol is added 284 grams of adipic acid. Reaction at 160°C. for 8 hours results in a viscous liquid with a Gardner color of less than one. Molecular weight of this product is 2770 with an acid number of 1.9 and a hydroxyl number of 120.

The polyurethane foam prepared from this hydroxylated polymer according to Example 1 has a denisty of 2.3 pounds per cubic foot with a tear strength of 3.8 pounds per inch.

EXAMPLE 5

This example demonstrates the use of neopentyl glycol as the diol in the polyesterether polymer synthesis.

To 408 grams of p-dioxanone, 124.8 grams of neopentyl glycol and 142 grams of adipic acid is added 13.4 grams of trimethylolpropane. This mixture is heated at 170°C. for 6 hours to give a viscous liquid with an acid number of 2.6, a hydroxyl number of 78 and a molecular weight of 2480.

This p-dioxanone containing polyesterether is formulated into a polyurethane foam according to Example 1 of this invention. This cured foam has a density of 2.5, a tear strength of 5.2 pounds per inch and good resistance to water.

EXAMPLE 6

This example demonstrates the use of diethylene glycol as the diol in the synthesis of the polyesterether polymer.

To a mixture of 142 grams of adipic acid, 134 grams of trimethylolpropane and 148.2 grams of diethylene glycol is added 255 grams of p-dioxanone. This mixture is heated at 160°C. for 7 hours to give a viscous liquid with a Gardner color of less than one. This polymer has an acid number of 23, a hydroxyl number of 98 and a molecular weight of 2230.

This hydroxylated polyesterether is crosslinked with tolylene diisocyanate according to Example 1 to give a flexible foam with properties similar to the foam obtained in Example 2 wherein ethylene glycol is the dihydroxyl component.

EXAMPLE 7

This example demonstrates the use of catalyst in the synthesis of the hydroxylated polyesterether polymer from p-dioxanone.

The procedure described in Example 1 is followed with the addition of 0.2 gram of dibutyltin dilaurate catalyst. After 5 hours at 160°C. the polymeric product has an acid number of 2.1, a hydroxyl number of 36.5, and a molecular weight of 2190.

The polyurethane foam prepared from this product exhibits similar physical properties to the foam described in Example 1.

Utility for the hydroxylated polyesterether polymers derived from p-dioxanone has application in polyurethane foamed polymers. These polyurethane foams have use in cushioning applications for the furniture and automotive industry. Further utility of these hydroxylated polyurethane can be found in insulation applications such as refrigeration appliances, flotation equipment and construction industry.

The invetnion has been described in detail with particular reference to preferred embodiments thereof, but it will be understood that variations and modifications can be effected within the spirit and scope of the invention.

We claim:

1. A foamed polyurethane prepared by reacting a polyisocyanate and a foamable composition containing a hydroxylated polyesterether prepared from p-dioxanone, diol and dicarboxylic acid, said hydroxylated polyesterether having an acid number of 1–5 and a hydroxyl number of 30–200.

2. A foamed polyurethane according to claim 1 wherein said hydroxylated polyesterether is prepared from a reaction mixture containing p-dioxanone, diol and dicarboxylic acid in a molar ratio of 1.0–7.5:1-.2–3.5:1.0.

3. A foamed polyurethane according to claim 2 wherein said diol is ethylene glycol.

4. A foamed polyurethane according to claim 2 wherein said diol is neopentyl glycol.

5. A foamed polyurethane according to claim 3 wherein said dicarboxylic acid is adipic acid.

6. A foamed polyurethane according to claim 4 wherein said dicarboxylic acid is adipic acid.

7. A foamed polyurethane according to claim 2 wherein said reaction mixture also contains at least one triol or tetrol.

8. A foamed polyurethane according to claim 7 wherein said reaction mixture contains p-dioxanone, diol, at least one triol or tetrol and dicarboxylic acid in a molar ratio of 1.0–7.5:1.2–3.5:0.01–5:1.0.

9. A foamed polyurethane according to claim 8 wherein said triol is trimethylolpropane.

10. A polymeric hydroxylated polyesterether having a hydroxyl number of 30–200 and an acid number of 1 to 5 prepared by reacting a reaction mixture comprising p-dioxanone, diol and a dicarboxylic acid.

11. A polymeric hydroxylated polyesterether according to claim 10 wherein said reaction mixture contains p-dioxanone, diol, and dicarboxylic acid in a molar ratio of 1.0–7.5:1.2–5:1.0.

12. A polymeric hydroxylated polyesterether according to claim 11 wherein said diol is ethylene glycol.

13. A polymeric hydroxylated polyesterether according to claim 11 wherein said diol is neopentyl glycol.

14. A polymeric hydroxylated polyesterether according to claim 12 wherein said dicarboxylic acid is adipic acid.

15. A polymeric hydroxylated polyesterether according to claim 13 wherein said dicarboxylic acid is adipic acid.

16. A polymeric hydroxylated polyesterether according to claim 10 wherein said reaction mixture also contains at least one triol or tetrol.

17. A polymeric hydroxylated polyesterether according to claim 16 wherein said reaction mixture contains p-dioxanone, diol, at least one triol or tetrol and dicarboxylic acid in a molar ratio of 1.0–7.5:1.2–3.5:0.01–0.5:1.0.

18. A polymeric hydroxylated polyesterether according to claim 17 wherein said triol is trimethylolpropane.

* * * * *